United States Patent Office 2,744,104
Patented May 1, 1956

2,744,104

PROCESS OF MAKING COPPER-CONTAINING MONOAZO DYESTUFFS

Hans Ruckstuhl, Basel, and Walter Wehrli, Riehen, Switzerland, assignors to Sandoz A. G., Basel, Switzerland, a Swiss firm No Drawing. Application July 3, 1952,
Serial No. 297,178

6 Claims. (Cl. 260—151)

The present invention relates to new copper-containing monoazo dyestuffs and intermediates and to the preparation thereof.

According to the present invention, briefly stated, the new products are obtained by subjecting aminoazo dyestuffs which correspond to the formula

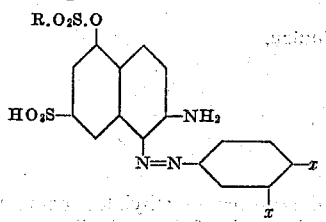

wherein R denotes an organic radical, one $x$ denotes hydrogen, halogen, lower alkyl, lower alkoxy or nitro, the other $x$ being a sulfonic acid group, to the action of nitrous acid, whereby the amino group is replaced by the hydroxy group, treating the thus-obtained hydroxyazo dyestuff with a copper salt in the presence of an oxidizing agent and subsequently with a saponifying agent to split off the sulfonic acid ester group.

The resulting new copper-containing monoazo derivatives correspond to the formula

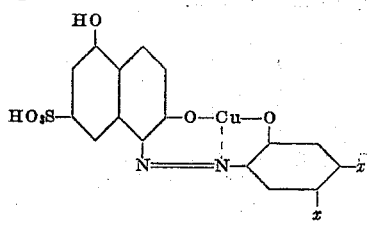

wherein, as in the initial aminoazo dyestuff, one $x$ denotes hydrogen, halogen, lower alkyl, lower alkoxy or nitro, the other $x$ being a sulfonic acid group. They are particularly valuable as coupling components and, because of their capability of coupling readily with diazo compounds of most diverse character, serve for the preparation of a wide variety of disazo and polyazo dyestuffs.

The aminoazo dyestuffs, utilized as starting materials in the present invention, are readily accessible compounds. The moiety R, the organic radical of the sulfonic acid ester group, may be of widely different character; thus, for example, R may be a radical of the composition

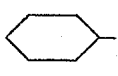 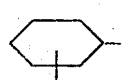 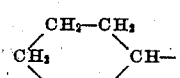

H₃C— or H₅C₂—, etc. The moiety

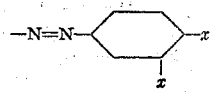

wherein by definition one x is hydrogen, halogen, lower alkyl, lower alkoxy or nitro and the other $x$ is the sulfonic acid group, may for example correspond to one of the following:

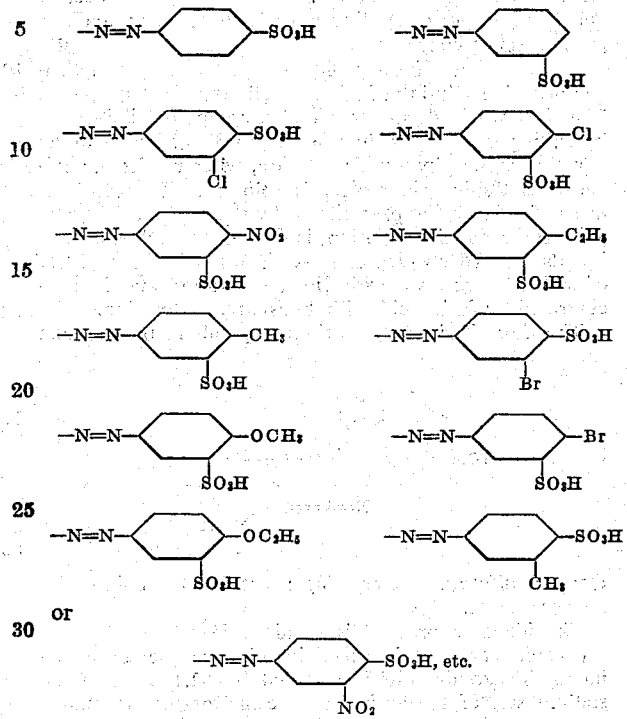

or

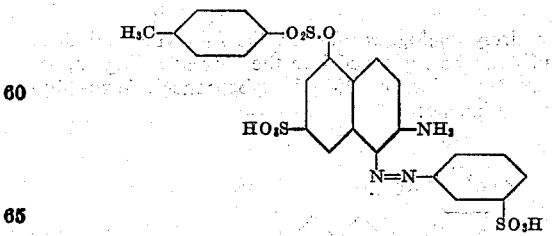

The replacement of the amino group by the hydroxy group in the initial aminoazo dyestuff is effected with especial ease by adding a nitrite to a neutral or very weakly alkaline aqueous solution of the aminoazo dyestuff, and then running the solution into a dilute mineral acid. After stirring for several hours, a substantially quantitative yield of hydroxyazo dyestuff is obtained.

Coppering of the latter is advantageously carried out in aqueous solution with an inorganic or organic copper salt in the presence of an oxidizing agent. The resultant copper complex compounds are derivatives of 2'-hydroxy-benzene-1,1'-azo-2-hydroxy-naphthalene. The saponification of the sulfonic acid ester group is carried out after the oxidative coppering, preferably in alkaline medium.

The following examples illustrate the invention, but are not intended to be restrictive thereof. Parts are parts by weight, percentages are percentages by weight; temperatures are in degrees centigrade.

*Example 1*

62.1 parts of the sodium salt of the aminoazo dyestuff of the formula are dissolved in 1000 parts of hot water and then there is added to the resultant solution a concentrated aqueous solution of 8.3 parts of sodium nitrite. The hot solution is then run into a mixture of 35 parts of concentrated hydrochloric acid and 100 parts of water, the temperature being maintained at 10° by the addition of ice. The mixture is stirred overnight at room temperature (20 to 30°) and is then adjusted to neutrality with the aid of sodium carbonate, after which the dyestuff is precipitated by the addition of sodium chloride to the reaction solution and is filtered off.

For oxidative coppering, the thus-obtained dyestuff paste is stirred into 500 parts of water at room temperature (20–30°). 50 parts of crystalline sodium acetate and 27.5 parts of crystalline copper sulfate are then added in the form of concentrated aqueous solutions, whereupon in the course of one hour 180 parts of an aqueous hydrogen peroxide solution of 5% strength are added dropwise. The thus-obtained copper complex compound is isolated by salting out, and is then heated to 80–85° with dilute aqueous sodium hydroxide solution, whereby the methylbenzenesulfonic acid moiety is split off. The resultant dyestuff, after being precipitated by the addition of acetic acid to the reaction solution, is filtered off and dried. It is a dark powder which dissolves in water in the presence of sodium carbonate with violet coloration and in concentrated sulfuric acid with bluish red coloration.

The thus-obtained dyestuff corresponds to the formula

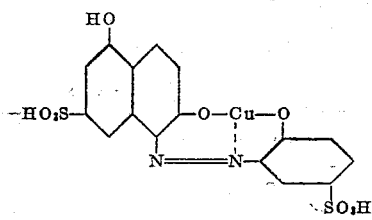

Copper sulfate as a coppering agent can be replaced by copper acetate.

The identical product is obtained if, while otherwise proceeding as aforedescribed in this example, the starting aminoazo dyestuff is replaced by 62.1 parts of the sodium salt of the aminoazo dyestuff of the formula

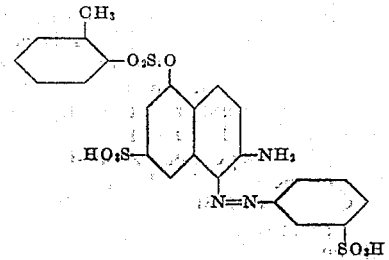

or by 60.7 parts of the sodium salt of the aminoazo dyestuff of the formula

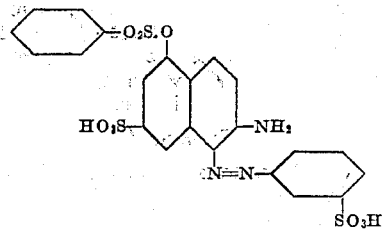

In entirely analogous manner, the following aminoazo dyestuffs can be converted into the corresponding copper complex derivatives of 2'-hydroxybenzene-1,1'-azo-2-hydroxynaphthalene:

(a)
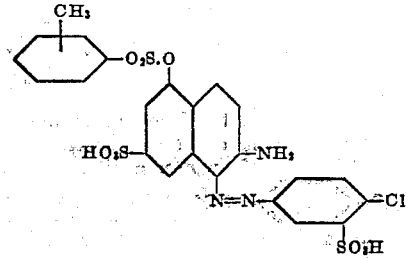

(b)
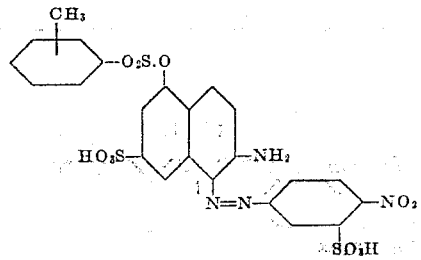

(c)
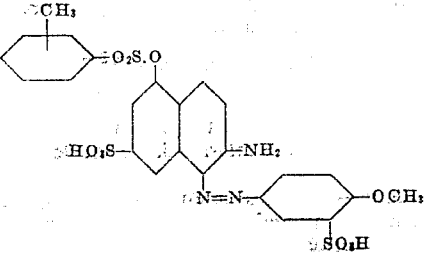

In these formulae, stands for the o- or p-methylated compounds. In all cases, the sodium salt of the methylbenzene-sulfonic acid ester of the aminoazo dyestuff may, without otherwise deviating from the described procedure and while obtaining the identical product, be replaced by an equivalent amount of the sodium salt of the benzenesulfonic acid ester or of the ethane-sulfonic acid ester or of the methane-sulfonic acid ester or of the cyclohexane-sulfonic acid ester.

The monoazo dyestuffs obtained in analogous manner from the aminoazo dyestuffs a, b and c, corresponding respectively to the formula:

(a)
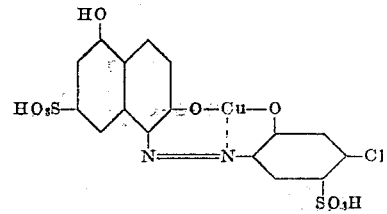

(b)
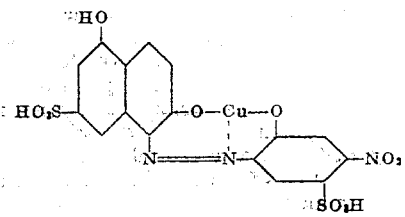

(c)
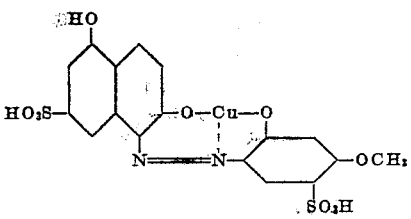

Example 2

60.7 parts of the sodium salt of the aminoazo dyestuff of the formula

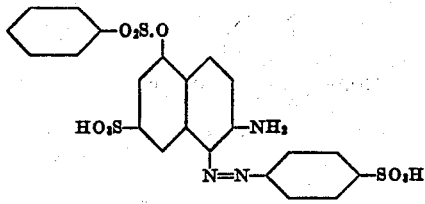

are dissolved in 1000 parts of hot water, and then a concentrated aqueous solution of 8.3 parts of sodium nitrite is added. The hot solution is run into a mixture of 35 parts of concentrated hydrochloric acid and 100 parts of water, the temperature being maintained at 10° by the addition of ice. The mixture is stirred overnight at room temperature (20–30°) and is then adjusted to neutrality with the aid of sodium carbonate, and the dyestuff is precipitated by the addition of sodium chloride to the reaction solution and is then filtered off.

For oxidative coppering, the thus-obtained dyestuff paste is stirred at room temperature (20–30°) into 500 parts of water. 50 parts of crystalline sodium acetate and 27.5 parts of crystalline copper sulfate are then added in the form of concentrated aqueous solutions and then, in the course of one hour, 30 parts of an aqueous hydrogen peroxide solution of 30% strength diluted with 150 parts of water are added dropwise. The thus-obtained copper complex compound is isolated by salting out and then heated to 80–85° with aqueous potassium hydroxide solution, whereby benzene-sulfonic acid is split off. Acetic acid is then added to the reaction solution and the thus-precipitated dyestuff is filtered off and dried. It is a dark powder which dissolves in water in the presence of sodium carbonate with violet coloration and in concentrated sulfonic acid with bluish red coloration.

The thus-obtained dyestuff corresponds to the formula

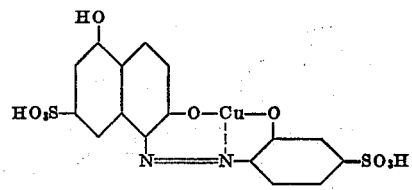

In strictly analogous manner, the aminoazo dyestuffs of the formula

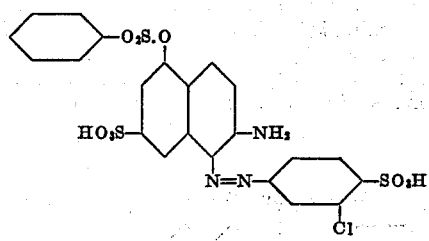

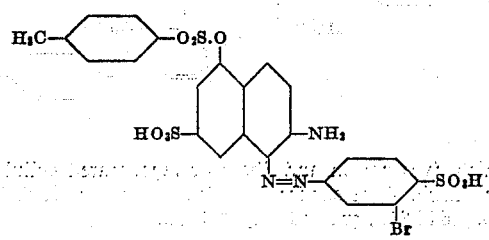

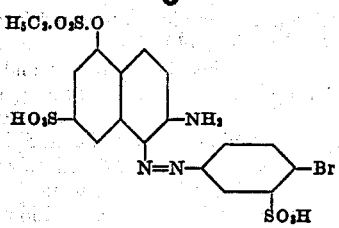

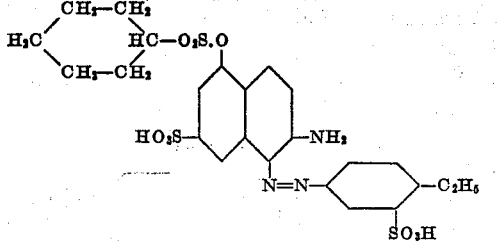

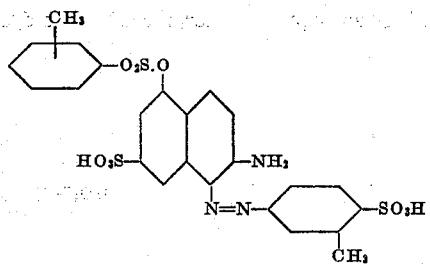

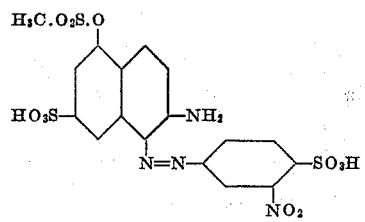

can be converted into the corresponding copper complex compounds. Instead of copper sulfate there can be used copper chloride, copper formiate or copper acetate.

Example 3

57.3 parts of the sodium salt of the aminoazo dyestuff of the formula

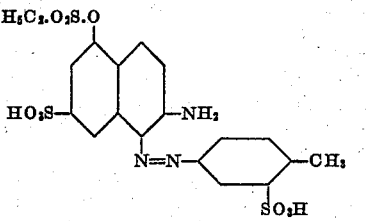

are dissolved in 1000 parts of hot water, and then a concentrated aqueous solution of 8.3 parts of sodium nitrite is added. The hot solution is run into a mixture of 35 parts of concentrated hydrochloric acid and 100 parts of water, the temperature being maintained at 10° by the addition of ice. The mixture is stirred overnight at room temperature (20–30°) whereupon it is adjusted to neutrality with sodium carbonate, and the dyestuff precipitated by the addition of an alkali metal salt to the reaction solution and then filtered off.

For oxidative coppering, the thus-obtained dyestuff paste is stirred into 500 parts of water at room temperature (20–30°). 50 parts of crystalline sodium acetate and 27.5 parts of crystalline copper sulfate in the form of concentrated aqueous solutions are then added, followed by the dropwise addition in the course of an hour of 180 parts of a 5% aqueous hydrogen peroxide solution. The thus-obtained copper complex compound is precitated by the addittion of sodium chloride to the coppering solution, filtered off with the aid of suction and then heated to 80–85° with dilute aqueous sodium hydroxide solution, whereby ethanesulfonic acid is split off. The resultant dyestuff, precipitated by the addition of acetic acid to the reaction solution, is filtered off and dried. It is a dark powder which dissolves in water in the presence of sodium carbonate with violet coloration and in concentrated sulfonic acid with bluish red coloration, and corresponds to the formula

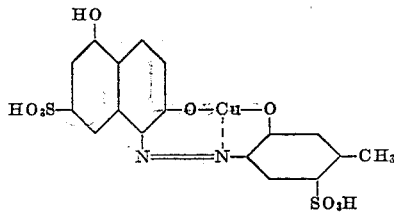

In strictly analogous manner, the aminoazo dyestuffs of the formula

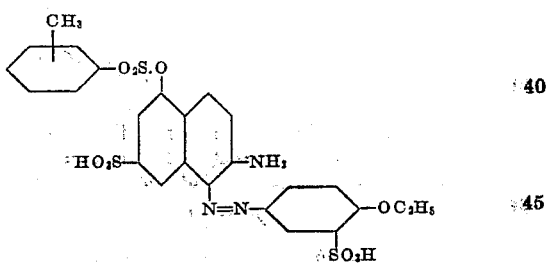

can be severally converted into the copper complex compound of 2'-hydroxybenzene-1,1'-azo-2-hydroxynaphthalene.

By replacing the ethane- or methylbenzene-sulfonic acid of the aminoazo dyestuffs of the present example by the equivalent amount of the methane-, cyclohexyl-, benzene- or any other readily accessible sulfonic acid ester, the same products result.

Copper sulfate, as a coppering agent can be replaced by another inorganic or organic copper salt, such as copper chloride, copper formiate or copper acetate. The saponification of the coppered dyestuffs in order to split off the organic sulfonic acid radical can be effected with potassium hydroxide solution instead of sodium hydroxide solution.

Example 4

1 mol of the copper-containing monoazo dyestuff of the formula

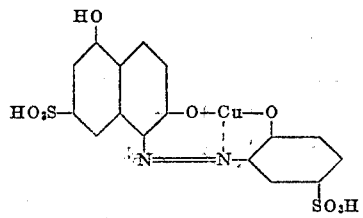

according to Example 1, is coupled with the intermediate prepared from 1 mol of tetrazotized 3,3'-dimethoxy-4,4'-diamino-1,1'-diphenyl and 1 mol of 1-hydroxynaphthalene-3,6-disulfonic acid. The resultant dyestuff is subjected to a demethylating coppering (e. g. according to the process described in U. S. Patent No. 2,529,527), whereby it is converted into the complex compound of the formula

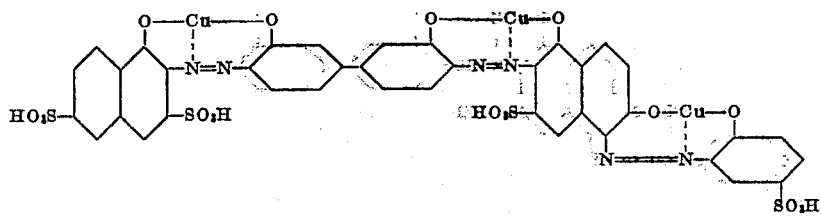

which dyes cotton and fibers of regenerated cellulose in fast marine-blue shades; see also copending U. S. Patent No. 2,644,812, granted July 7, 1953.

Example 5

1 mol of the copper-containing monoazo dyestuff of the formula

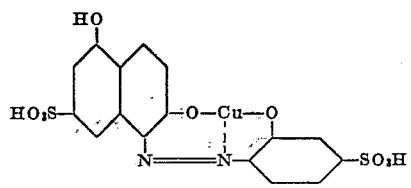

according to Example 2, is coupled with the intermediate prepared from 1 mol of tetrazotized 3,3'-dimethoxy-4,4'-diamino-1,1'-diphenyl and 1 mol of 1-hydroxynaphhtalene-3,6-disulfonic acid. The resultant dyestuff is subjected to a demethylating coppering (e. g. according to the process described in U. S. Pat. 2,529,527), whereby it is converted into the complex compound of the formula

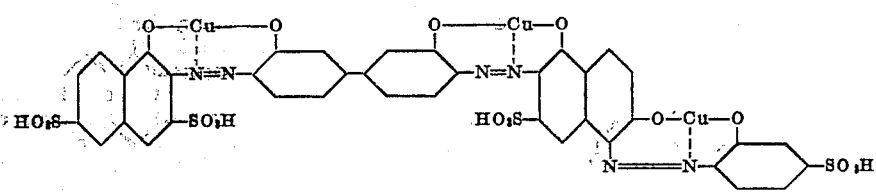

which dyes cotton and fibers of regenerated cellulose in fast marine-blue shades; see also copending U. S. Patent No. 2,644,812, granted July 7, 1953.

Example 6

1 mol of the copper-containing monoazo dyestuff of the formula

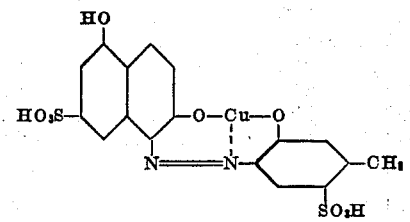

according to Example 3, is coupled with the intermediate prepared from 1 mol of tetrazotized 3,3′-dimethoxy-4,4′-diamino-1,1′-diphenyl and 1 mol of 1-hydroxynaphthalene-3,8-disulfonic acid. The resultant dyestuff is subjected to a demethylating coppering (e. g. according to the process described in U. S. Pat. No. 2,529,527), whereby it is converted into the complex compound of the formula

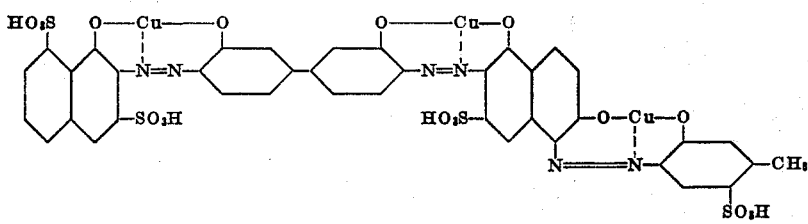

which dyes cotton and fibers of regenerated cellulose in fast marine-blue shades; see also copending U. S. Patent No. 2,644,812, granted July 7, 1953.

Having thus disclosed the invention, what is claimed is:

1. A process of preparing a copper-containing monoazo compound, comprising the steps of replacing the amino group by the hydroxy group in an aminoazo dyestuff corresponding to the formula

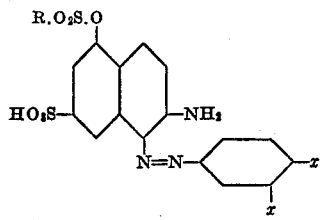

wherein R stands for an organic radical, one $x$ stands for a member selected from the group consisting of hydrogen, halogen, lower alkyl, lower alkoxy and nitro, the other $x$ being a sulfonic acid group, by means of nitrous acid, treating the thus-obtained hydroxyazo dyestuff with a copper salt in the presence of an oxidizing agent and subsequently with a saponifying agent to split off the sulfonic acid ester group.

2. A process of preparing a copper-containing monoazo compound, comprising the steps of replacing the amino group by the hydroxy group in the aminoazo dyestuff corresponding to the formula

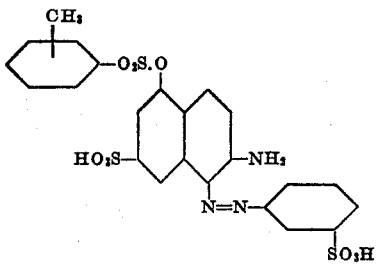

by means of nitrous acid, treating the thus-obtained hydroxyazo dyestuff with a copper salt in the presence of an oxidizing agent and subsequently with a saponifying agent to split off the sulfonic acid methylphenyl ester group.

3. A process of preparing a copper-containing monoazo compound, comprising the steps of replacing the amino group by the hydroxy group in the aminoazo dyestuff corresponding to the formula

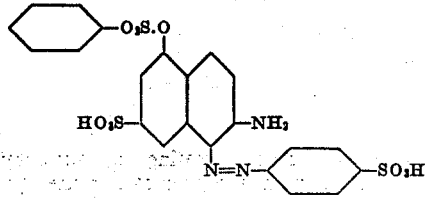

by means of nitrous acid, treating the thus-obtained hydroxyazo dyestuff with a copper salt in the presence of an oxidizing agent and subsequently with a saponifying agent to split off the sulfonic acid phenyl ester group.

4. A process of preparing a copper-containing monoazo compound, comprising the steps of replacing the amino group by the hydroxy group in the aminoazo dyestuff corresponding to the formula

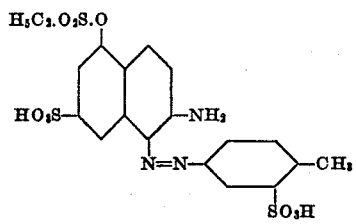

by means of nitrous acid, treating the thus-obtained hydroxyazo dyestuff with a copper salt in the presence of an oxidizing agent and subsequently with a saponifying agent to split off the sulfonic acid ethyl ester group.

5. A process of preparing a copper-containing monoazo compound, comprising the steps of replacing the amino group by the hydroxy group in the aminoazo dyestuff corresponding to the formula

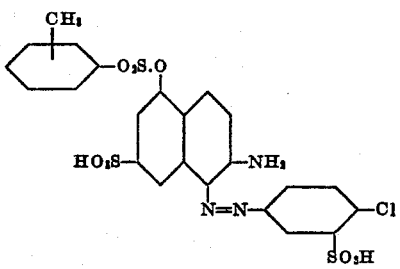

by means of nitrous acid, treating the thus-obtained hydroxyazo dyestuff with a copper salt in the presence of an oxidizing agent and subsequently with a saponifying agent to split off the sulfonic acid methylphenyl ester group.

6. A process of preparing a copper-containing monoazo compound, comprising the steps of replacing the amino group by the hydroxy group in the aminoazo dyestuff corresponding to the formula

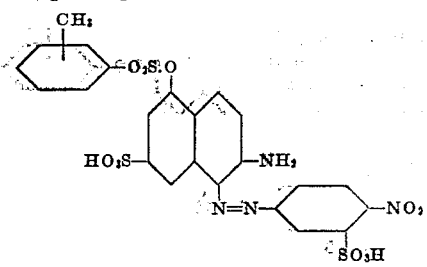

by means of nitrous acid, treating the thus-obtained hydroxyazo dyestuff with a copper salt in the presence of an oxidizing agent and subsequently with a saponifying agent to split off the sulfonic acid methylphenyl ester group.

References Cited in the file of this patent

UNITED STATES PATENTS

| | | |
|---|---|---|
| 1,836,884 | Straub | Dec. 15, 1931 |
| 2,062,547 | Wiedemann et al. | Dec. 1, 1936 |
| 2,090,432 | Straub | Aug. 17, 1937 |
| 2,111,029 | Moll et al. | Mar. 15, 1938 |
| 2,418,416 | Locke | Apr. 1, 1947 |
| 2,620,332 | Widmer et al. | Dec. 2, 1952 |
| 2,644,812 | Ruckstuhl et al. | July 7, 1953 |

FOREIGN PATENTS

| | | |
|---|---|---|
| 478,274 | Canada | Nov. 6, 1951 |

OTHER REFERENCES

Ser. No. 394,839, Mueller (A. P. C.), published Apr. 20, 1943.